(12) United States Patent
Belanger

(10) Patent No.: US 9,565,083 B2
(45) Date of Patent: Feb. 7, 2017

(54) IN-BAND SIGNALING FOR NETWORK PROTECTION SWITCHING

(71) Applicant: Ciena Corporation, Hanover, MD (US)

(72) Inventor: Martin G. Belanger, Penngrove, CA (US)

(73) Assignee: Ciena Corporation, Hanover, MD (US)

( * ) Notice: Subject to any disclaimer, the term of this patent is extended or adjusted under 35 U.S.C. 154(b) by 134 days.

(21) Appl. No.: 14/550,245

(22) Filed: Nov. 21, 2014

(65) Prior Publication Data

US 2016/0149752 A1    May 26, 2016

(51) Int. Cl.
*H04L 12/26* (2006.01)
*H04L 12/24* (2006.01)

(52) U.S. Cl.
CPC .......... *H04L 43/08* (2013.01); *H04L 41/0659* (2013.01); *H04L 41/0672* (2013.01); *H04L 41/0695* (2013.01)

(58) Field of Classification Search
CPC ............................ H04L 41/0672; H04L 43/08
USPC ......................................................... 370/216
See application file for complete search history.

(56) References Cited

U.S. PATENT DOCUMENTS

| | | | | |
|---|---|---|---|---|
| 5,712,847 A * | 1/1998 | Hata | ........................ | H04L 1/22 370/228 |
| 7,126,908 B1 * | 10/2006 | Lu | .......................... | H04J 3/085 370/228 |
| 7,174,096 B2 * | 2/2007 | Berthold | ............. | H04B 10/2503 398/1 |
| 7,266,296 B2 * | 9/2007 | Ovadia | .............. | H04Q 11/0066 398/45 |
| 7,450,493 B1 * | 11/2008 | Brown | ...................... | H04J 3/14 370/216 |
| 7,570,583 B2 * | 8/2009 | Broberg | .................... | H04J 3/14 370/219 |
| 9,258,215 B2 * | 2/2016 | Hussain | .................. | H04L 45/22 |
| 2004/0013129 A1 * | 1/2004 | Fang | ..................... | H04L 49/606 370/466 |

(Continued)

OTHER PUBLICATIONS

ITU-T, "G.709/Y.1331 Interfaces for the optical transport network", Feb. 2012, ITU-T, p. 64.*

(Continued)

*Primary Examiner* — Un C Cho
*Assistant Examiner* — Shah Rahman
(74) *Attorney, Agent, or Firm* — Clements Bernard PLLC; Christopher L. Bernard; Lawrence A. Baratta, Jr.

(57) ABSTRACT

Systems are disclosed for automated protection switching enabled by in-band signaling. A status monitor coupled to a switch fabric may be operable to read signal quality information from cells packet-switched over the fabric, the cells carrying traffic signals from one or more working channels between two network nodes. The status monitor may apply a protection algorithm to the signal quality information to determine whether a traffic signal on a working channel meets requirements indicative of channel failure or degradation sufficient to move the traffic signal to an additional protection channel between the two nodes. The status monitor may encode a request to transfer this traffic signal in cells switched by the fabric. In some examples, this request may be encoded in an optional user and fabric overhead field of cells consistent with the Optical-Transport Network (OTN) over Packet Fabric Protocol (OFP).

20 Claims, 8 Drawing Sheets

(56) References Cited

U.S. PATENT DOCUMENTS

| | | | |
|---|---|---|---|
| 2004/0156313 A1* | 8/2004 | Hofmeister | H04L 12/4633 370/229 |
| 2010/0135291 A1* | 6/2010 | Martin | H04L 45/00 370/389 |
| 2010/0157994 A1* | 6/2010 | Beisel | H04Q 3/0045 370/355 |
| 2010/0260197 A1* | 10/2010 | Martin | H04L 12/4625 370/408 |
| 2014/0177452 A1* | 6/2014 | Loehr | H04L 12/5601 370/241.1 |

OTHER PUBLICATIONS

ITU-T, "G.873.1 Optical Transport Network (OTN): Linear protection", Jul. 2012, ITU-T, p. all.*

ITU, "Ethernet Protection Switching", Jun. 2006, ITU, G.8031/Y.1342, pp. 15-22.*

* cited by examiner

IN-BAND SIGNALING FOR NETWORK PROTECTION SWITCHING

FIELD OF THE INVENTION

This invention relates to the protection of traffic signals in a network and more particularly to the architecture of control signaling to coordinate the protection of a traffic signal between two network nodes by transferring the traffic signal from a compromised working channel to an additional protection channel.

BACKGROUND OF THE INVENTION

Involvement by a network administrator to repair a damaged communications network can result in unacceptable delays and lost data. Reliable communication networks take into account potential degradation or failure of the channels over which traffic signals are transported through redundancy in the network. The need to quickly repair communication of networks leads to the automation of the controls by which redundancies may be accessed.

The objective of such automation is to transfer a traffic signal to a redundant, or protection, channel from a degraded or failed channel with small enough latencies that the process is transparent to end users. To meet this objective an upper boundary on latency is commonly set at fifty milliseconds, with even shorter latencies preferable. However, the control signaling involved in coordinating a determination to transfer a traffic signal from a compromised channel often pushes and/or transgresses this upper boundary.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not, therefore, to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, can be arranged and designed in a wide variety of different configurations. Thus, the following more detailed description of the embodiments of the invention, as represented in the figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout. In some cases, particular instances of an element may be identified with a number followed by a letter, where the letter may change throughout the figures, indicating differing instances of the element with the same or varying attributes. References to elements by number only may refer more generally to a class of such elements.

Figure 1:
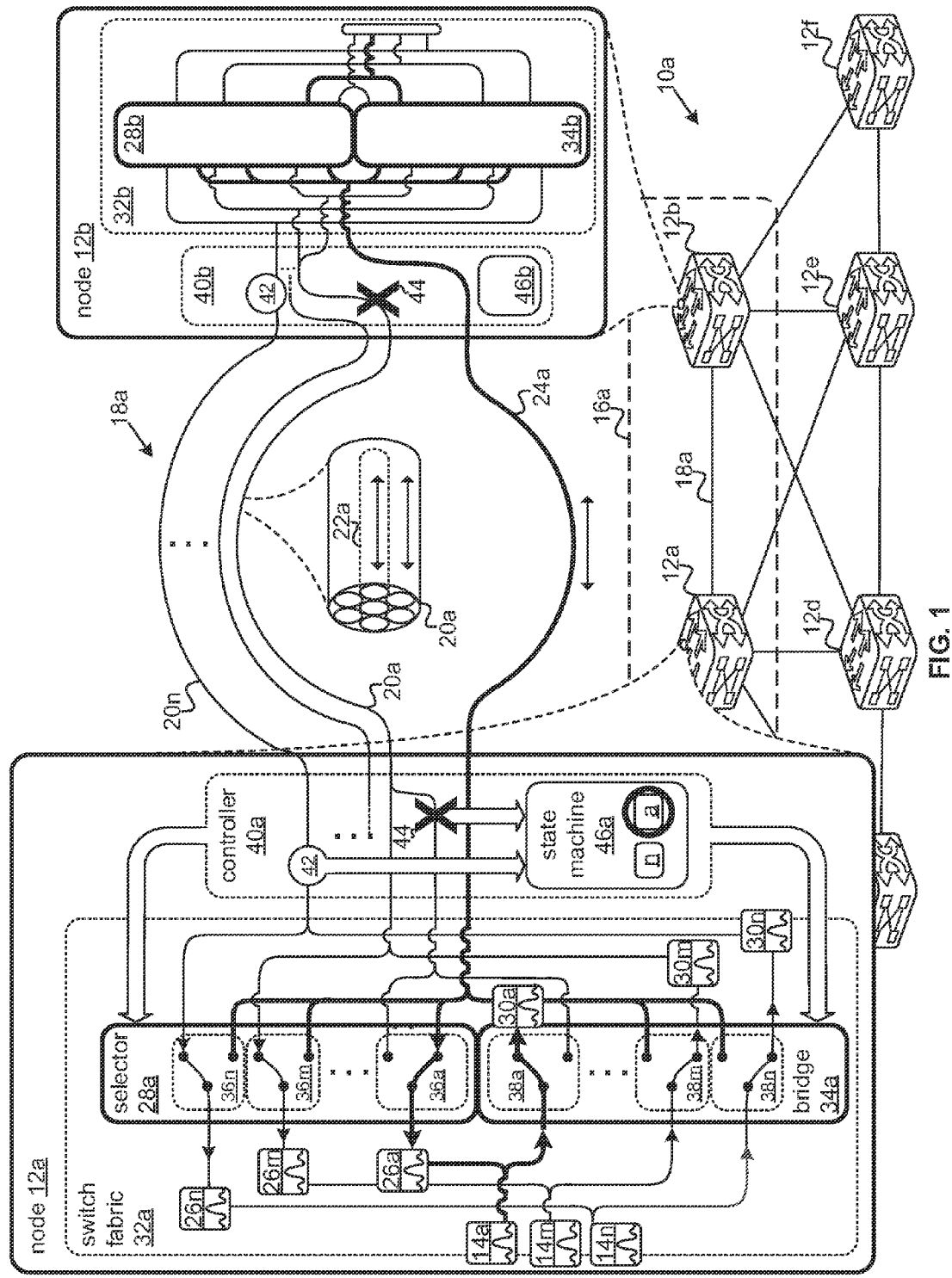
FIG. 1 is a schematic block diagram of a group of channels, including a protection channel, between a pair of network nodes, together with architecture at the two nodes to enable the transfer of a traffic signal from a compromised channel to the protection channel, in accordance with examples.

Referring to FIG. 1, a portion of a communication network 10a including multiple switches 12a-f is depicted. In non-limiting examples where the portion of the communication network 10a serves as part of a backbone to a larger communication network 10, the portion of the communication network 10a may implement an Optical Transport Network (OTN). In such examples, the switches 12a-f may serve as Optical Network Elements (O.NE).

Exploded views are provided of the architecture involved in the protection of multiple traffic signals 14a-n communicated between a pair 16a of nodes 12a, 12b. In some examples, a communication link 18a between the pair 16a of nodes 12a, 12b may, without limitation, be implemented as a ring 18a. The communication link 18a may, but need not necessarily, include multiple optical fibers 20a-n. Such optical fibers may be bidirectional and/or unidirectional, depending on the example. In some examples, an individual fiber 20 may provide a physical medium for one or more working channels 22a-n, which may also be bidirectional and/or unidirectional, depending on the example. The working channels 22a-n may be bundled with a protection channel 24a in a protection group.

The protection channel 24a may be implemented on an optical fiber 20 separate from the one or more optical fibers 20 so that damage to a fiber 20 supporting a working channel 22 does not compromise the protect channel 24a, which also may be bidirectional or unidirectional, depending on the example. As can be appreciated, multiple combinations of fibers 20, working channels 22, and the protection channel 24d may be implemented in various configurations, such as, for example, 1+1, 1:1, $(1:1)^n$, 1:n, and/or m:n. As can be appreciated, although the protection group is depicted without any intervening nodes, in some examples it may be possible that one or more of the channels 22, 24 may include an intermediate node.

Exploded views are depicted of architecture involved in management of a protection channel 24a to which a traffic signal 14 on a compromised channel 22 may be redirected. For ease of explanation, such architecture is described in detail with respect to the first network node 12a, the second network node 12b having elements corresponding to those of the first network node 12a, although not depicted in as great detail. In examples with bidirectional channels 22, a traffic signal 14 may include a first component 26 received from a second node 12b in the pair 16a and a second component 30 sent from the first node 12a to the second node 12b.

The nodes 12a, 12b may be provided with switch fabric 32a to switch, or direct, the traffic signals 14a-n from other nodes 12b-f to other nodes 12b-f, moving the traffic signals 14 toward their intended destinations in the network 10. Switch fabric 32a, 32b may include a selector 28a, 28b and/or a bridge 34a, 34b. The selector 28a may select a channel 22, 24, between the node pair 16a, over which the first component 26 of a traffic signal 14 is received. The bridge 34a, 34b may select the channel 22, 24 for the node pair 16 over which a second component 28 of the traffic signal 14 is sent. Both the selector 32a, 32b and the bridge 34a, 34b may be able to couple a traffic signal 14 to multiple different channels 22, 24.

A selector 28a, 28b may include multiple selector instances 36a-n. Each traffic signal 14 may be provided with a corresponding selector instance 36. A selector instance 36 may cause the first component 26 of a traffic signal 14 to be received over the corresponding working channel 22 or over the protection channel 24a. For purposes of explanation, individual selector instances 36a-n are depicted as a toggle switch between a working channel 22 and the protection channel 24a, however, a selector 32, as can be appreciated, may be implemented with any number of technologies.

Similarly, a bridge 34a, 34b may include multiple bridge instances 38a-n. Each traffic signal 14 may be provided with a corresponding bridge instance 38. A bridge instance 38 may cause the second component 30 of a traffic signal 14 to be sent. Although the bridge instances 38a-n are depicted along the lines of a selector bridge as defined in ITU-T-REC-G.870, other implementations consistent with this standard, such as a permanent bridge, an extra-traffic bridge, and/or a broadcaster bridge, or inconsistent with this standard, are possible, depending on the example.

To automatically adjust to changing channel conditions, the nodes 12a, 12b in the pair 16a may include controller architecture 40a, 40b that may monitor the working channels 22a-n and/or the protection channel 24a to detect the presence of signal degradation 42 and/or signal failure 44 on the various channels 22a-n, 24a from traffic signals 14 received at the first node 12a. Furthermore, a signal degradation 42 and/or signal failure 44 detected at one node 12 in the pair 16a may be communicated to the other node 12. In the example depicted in FIG. 1, a signal degradation 42 is detected on a first working channel 22a and a signal failure 44 is detected on another working channel 22n.

The control architecture 40 may apply a protection algorithm 46 to any detections of signal degradation 42 and/or signal failure 44 to determine whether to transfer a signal 14 from one channel 22, 24 to another channel 22, 24. In cases of competing claims to the protection channel 24a, the protection algorithm 46 may decide among traffic signals 14. The controller 40a on the first node 12a may also coordinate with a controller 42b on the second node 12b, also implementing the protection algorithm 46, to determine which transfer, if any, to privilege, in the case of a discrepancy. The controllers 40a, 40b may transfer a traffic signal 14 from a working channel 22 to the protection channel 24a, or back from the protection channel 24a, by altering a combination of bridges 34a, 34b and/or selectors 28a, 28b, depending on the unidirectional and/or bidirectional configuration of the relevant channels 22, 24.

In the example, depicted in FIG. 1, the protection algorithm 46a indicates that the signal failure 44 on working channel 22a trumps the signal degradation 44 on working channel 22n. Consequently, the first controller 40a is depicted changing the selector instance 36a and the bridge instance 38a from the first working channel 22a to the protection channel 24a. Reciprocal operations may be performed by the second controller 40b at the second node 12b. The foregoing discussion explains a generalized architecture for the automation of protection switching, without regard to details about how such architectures are actually implemented and the resultant latencies arising from these implementations. These issues are taken up with respect to the following figure.

Figure 2:
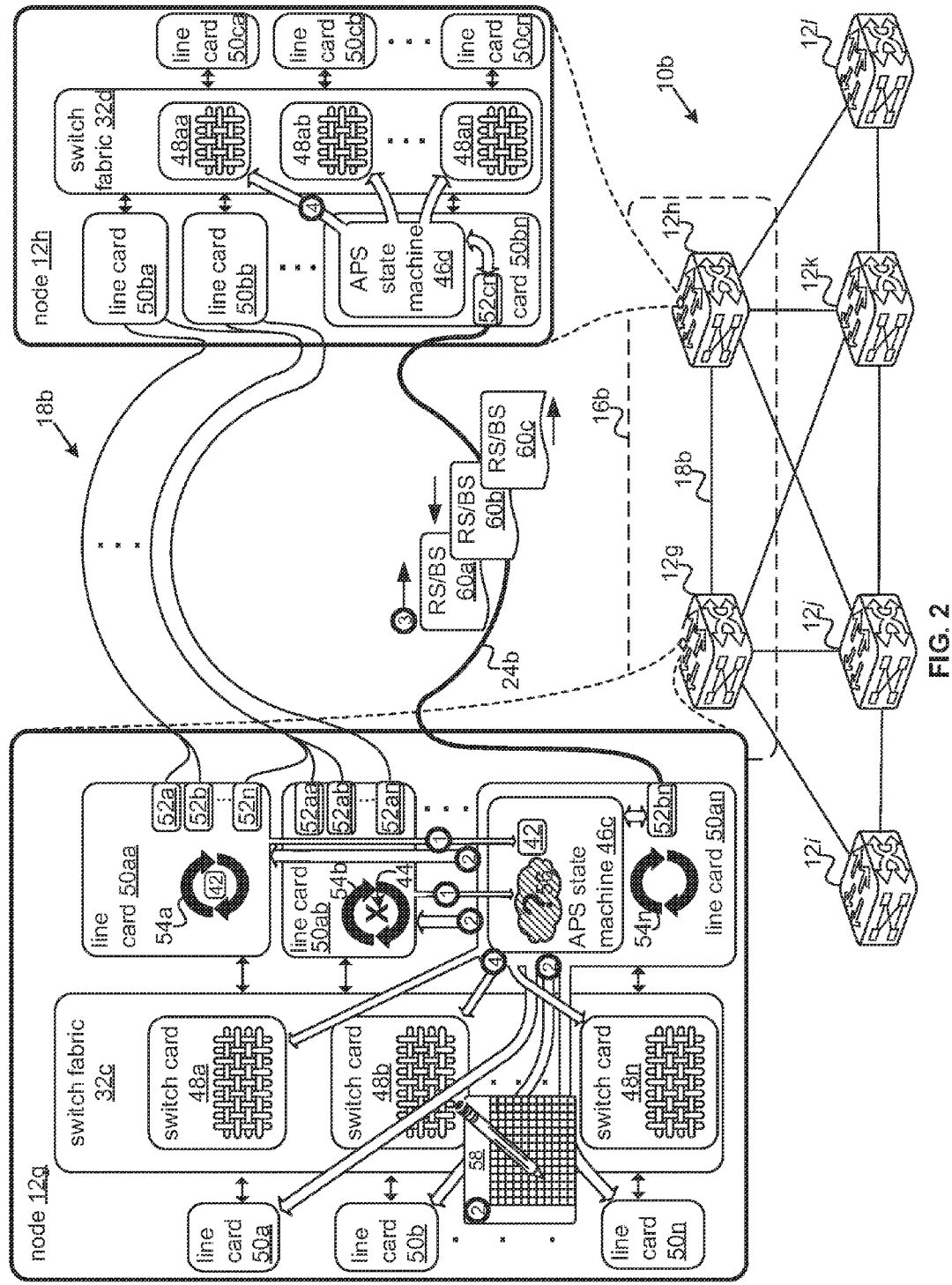
FIG. 2 is a schematic block diagram of aspects of out-of-band control signaling to coordinate the switching of a traffic signal to a protection channel among the multiple cards at a node, resulting in potentially problematic latency times.

Referring to FIG. 2, latency introducing issues are discussed in terms of a more detailed depiction representative of actual implementations. As before, a portion of a communications network 10b, including multiple network switches 12g-l, is depicted, with particular emphasis on a pair 16b of network nodes 12g, 12h and a communication link 18b, implemented as a ring 18b, between them. However, although architecture similar to that discussed in FIG. 1 is realized at a functional level, many more elements are involved at individual network nodes 12.

The switch fabrics 32c, 32d, for example, may be implemented with multiple switch cards 48a-n, 48aa-an. The functionality of selectors 28 and bridges 34 may be spread across these multiple switch cards 48a-n, 48aa-an. Similarly, the functionality of the controllers 40 may be distributed across multiple line cards 50a-n, 50aa-an, 50ba-bn, and 50ca-cn at the two network nodes 12g, 12h. The distribution of the functionalities discussed with respect to the previous figure across so many cards 48a-n, 48aa-an, 50a-n, 50aa-an, 50ba-bn, and 50ca-cn can extend the complexity of coordinating the transfer of a traffic signal 14 from coordination between the pair 16b of nodes 12g, 12h to include the coordination of the various cards 48a-n, 48aa-an, 50a-n, 50aa-an, 50ba-bn, and/or 50ca-cn.

Individual line cards 50a-n, 50aa-an, 50ba-bn, and/or 50ca-cn may provide one or more ports 52a-n, 52aa-an, 52ba-bn, 52cn for the various working channels 22aa-an and the protection channel 24b. As a traffic signal 14 is received at these various ports 52a-n, 52aa-an, 52ba-bn, 52cn, corresponding line cards 50a-n, 50aa-an may perform signal monitoring operations 54a-n to detect signal degradation 42 and/or signal failure 44 on the various channels 22aa-an, 24b. As with the scenario depicted in FIG. 1, in FIG. 2, signal monitoring operations 54a, 54b detect signal degradation 42 on channel 22an and signal failure 44 on channel 22aa.

Currently, approaches to coordinating responses to the detection of one or more channels 22, 24 with signal degradation 42 and/or signal failure 44 at the level of a node 12 with multiple line cards 52a-n, 52aa-an and/or switch cards 48a-n is achieved by out-of-band communications between cards 52a-n, 52aa-an, 48a-n. For example, a protection algorithm 46c may be implemented at the first node 12g on a single line card 52an to insure a single determination for the node 12g with respect to utilization of the protection channel 24b. However, the detection of one or more channels 22, 24 with signal degradation 42 and/or signal failure 44 may take place at many different line cards 50aa-an, as is the case in FIG. 2, where such detections are made on two different line cards 50aa, 50ab, both of which do not carry the protection algorithm 46c. Therefore, the two line cards 50aa, 50ab may use a first step of out-of-band communication to communicate the signal degradation 42 and signal failure 44 to the protection algorithm 46c.

However, a common problem with such out-of-band communications can be a failure to receive 56 a message indicating the detection of signal degradation 42 and/or signal failure 44. As a result, the protection algorithm 46c may not make a correct transfer determination. To prevent such errors, a second step may be employed which may entail an audit 58 of the various line chard 50a-n, 50aa-an.

Such an audit 58 may be performed with additional out-of-band signaling and/or communications. The various line cards 50 supporting the working channels 22aa-an may maintain state information for the channels 22 they support, with examples of such states including no defect, signal degradation 42 and/or signal failure 44. Therefore, to perform the audit, the line card 50an with the protection algorithm 46c, which may be implemented as a state machine 46c, may poll to the various line cards 50a-n, 50aa-an supporting the working channels 22aa-an through out-of-band communications.

Additionally, coordination of traffic signal transfer involves coordination between the two nodes 12g, 12h supporting the channels 22, 24. This may be accomplished, according to a third depicted step, by inter-node messages 60a-c. The example depicted in FIG. 2 is consistent with the three phase approach to Automatic Protection Switching (APS) protocol discussed in ITU-T-REC-G.870. However, as can be appreciated, other approaches involving different numbers of messages 60 and/or consistent with other protocols may be applied.

Once a transfer determination is made, it may be communicated, potentially again through out-of-band signaling as part of a fourth step, to the switch cards 48a-n, 48aa-an at the two network nodes 12g, 12h to implement the requisite bridge and selector changes to transfer a traffic signal 14 relative to the protection channel 24b. Unfortunately, this out-of-band signaling holds up the in-band communications of the network 10, which may often be made to wait on the out-of-band signaling before it can proceed. Indeed this out-of-band signaling is often responsible for much of the latency that can push and even transgress the fifty millisecond maximum threshold time for transferring traffic signals 14.

Before addressing innovations to avoid such latencies, an additional figure is described below. The additional figure is used to explain aspects of many communication networks 10 in terms of how the switch fabric 32 handles the routing of traffic signals 14. Aspects of such details may be harnessed to avoid the latencies resulting from out-of-band signaling.

Figure 3:
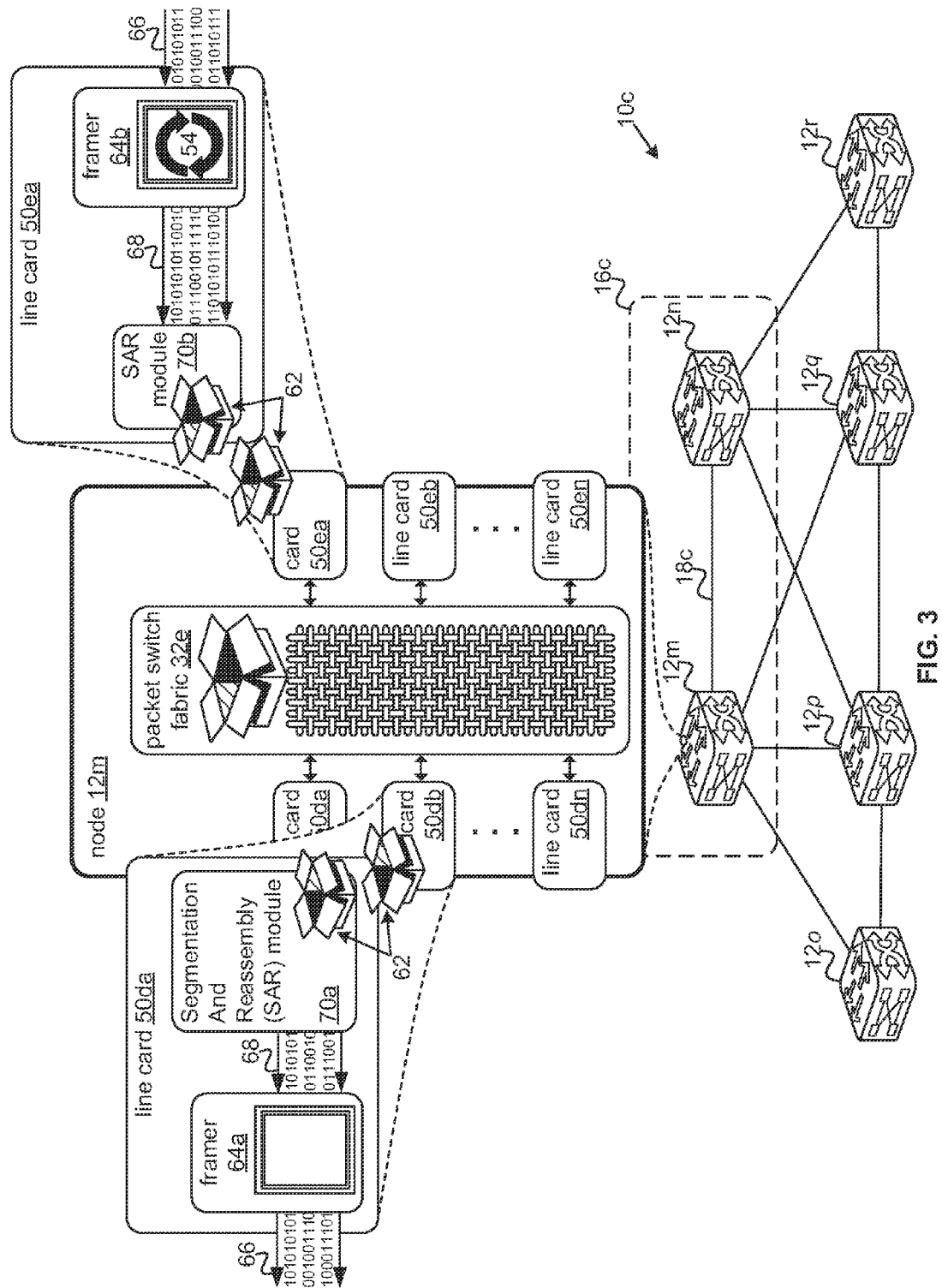
FIG. 3 is a schematic block diagram of the framing and segmentation of data streams into data units and cells, respectively, to allow traffic signals to be packet-switched by switch fabric constrained to such cells, together with the reassembly of a data stream egressing from the switch fabric, in accordance with examples.

Referring to FIG. 3, an architecture for segmenting traffic signals 14 into cells 62 that may be routed by switch fabric 32e is depicted, together with architecture for reassembling the cells 62 into another format for transport between nodes 12. Many communication networks 10 transport traffic signals 14 between nodes 12 in a format different from the format required by a switch matrix 32, or switch fabric 32, residing at a node 12 and used to direct the traffic signals 14. For example, the traffic signals may be transported between nodes 12 as a stream of data, anticipating circuit-switched fabric 32 at the node. However, the switch matrix 32e may provide packet-switched services on cells 62. Additionally, in examples where traffic signals 14 are transported between nodes 12 in packets, the sizes of such packets may not match one or more sizes for packets/cells 62 that the switch fabric 32e is able to handle.

Examples of such conflicts may be found in Optical Transport Networks (OTN) 10 converged with Ethernet networks 10. Traffic signals 14 on OTN networks 10 involve data streams and/or units of data that are inconsistent with packet switch fabric 32 and the packet-switched approach of Ethernet. To avoid the need for different types of switch fabric 32 at switches 12 in such converged networks 10, approaches have been developed to interface a single packet switch fabric 32 for an individual switch 12 with the conflicting data streams and/or data unit sizes of OTN networks 10. The example architecture depicted in FIG. 3 is consistent with these approaches.

Again, a portion of a communications network 10c, including multiple network switches 12m-r is depicted, with a pair 16c of network nodes 12m, 12n with a communication link 18c between them. An exploded view is provided of architecture at the first node 12m, which may, without limitation, be an Optical Network Element (O.NE) 12m. The architecture may integrate a packet switch fabric 32e in a communication network 10c, such as, without limitation, an OTN communication network 10c, that uses a different format for internode communications than the packets/cells 62 accommodated by the switch fabric 32e.

The switch fabric 32e may be coupled with multiple line cards 50 over which traffic signals 14 may be received and sent. Exploded views of two such line cards 50db, 50ea are depicted to describe architecture for the different cases for the ingress and the egress of traffic signals 14. In some examples, a line card 50 may be provided with a framer 64, such as, without limitation, an OTN framer 64. In the case of the ingress of traffic signals 14, the framer 64b may serve to frame a data stream 66 received from a second node 12. In examples involving OTN, the framer 64b may organize incoming data 66 into streaming Optical Data Units (ODU) 68. Additionally, the framer 64b may engage in monitoring operations 54 to monitor the signal quality of one or more traffic signals 14 received over one or more channels 22, 24 at the line card 52ea. Non-limiting examples of such monitoring operations 54 may include Forward Error Correction (FEC) and/or the reading of signal quality information encoded in the traffic signals 14.

The data units 68 generated by the framer 64b may not be supported by the packet switch fabric 32e. For example, such data units 68 may be much larger than the packets/cells 62 supported by the switch fabric 32e. Consequently, the ingress line card 50ea may be provided with a cell module 70b, such as a Segmentation And Reassembly (SAR) module 70b. The cell/SAR module 70b may be operable to segment streaming data units 68 from the framer 64b into packets/cells 62 to support packet-switched routing by the switch fabric 32e. In some examples, the cell/SAR module 70b may be operable to segment streaming ODUs 68 into packets/cells 62 organized according to the Optical Transport Network (OTN) over Packet Fabric Protocol (OFP) Implementation Agreement.

Conversely, in the case of the egress of traffic signals 14, the line card 50d over may include a trailing cell/SAR module 70a that may be operable to reassemble the packets/cells 62 into streaming data units 68. In examples, where the cells 62 are consistent with the OFP, the trailing cell/SAR module 70a may reassemble cells into streaming ODUs 68. These streaming data units 68 may then be processed by another framer 64a for transmission to another node 12 in the network 10.

To avoid the latency arising from out-of-band signaling, innovations may be developed to harness cells/packets 62 specifically created to enable packet-switched operation of switch fabric 32. A generalized overview of such innovations is provided below. More detailed accounts and/or examples are provided with respect to FIGS. 4 through 8.

For example, systems for automated network protection may be designed to utilize in-band signaling to control the transfer of traffic signals 14 between channels 22, 24. Such systems may include a channel monitor 54 at a first network node 12. The channel monitor 54 may be operable to augment a traffic signal 14 received at the first network node 12 with a signal quality indicator for a working channel 22 carrying the traffic signal 14 between the first network node 12 and a second network node 12

Additionally, a switch matrix 32 at the first network node 32 may be operable to perform packet-switched routing of data cells 62 carrying the traffic signal 14. A status monitor may be communicatively coupled to the switch matrix 32. The status monitor may be operable to read the signal quality indicator for the working channel 22 from a data cell 62 in which the signal quality may be embedded during the monitoring of the traffic signal 14.

The status monitor may also be operable to indicate placement of the traffic signal 14 from the working channel 22 onto a protection channel 24 between the first network node 12 and the second network node 12. The status monitor may indicate the placement based on the signal quality indicator satisfying requirements imposed by a protection algorithm 46 and/or state-machine-implemented algorithm 46 provided by the status monitor. Additionally, the status monitor may be further operable to place the placement indicator for placement of the traffic signal 14 from the working channel 22 onto the protection channel 24 into data cells 62 handled by the switch matrix 32.

In this way, the control information, in the form of the placement indicator, may be incorporated into the in-band signaling, avoiding reliance on the out-of-band communications responsible for so much latency. To coordinate the transfer of a traffic signal 14 between channels 22, 24, the placement indicator may be communicated to the second network node 12. For example, systems may also include a cell module 70, such as, without limitation, a SAR module 70. The cell module 70 may be operable to re-assemble data cells 62 from the switch fabric 32 into an internode format 68, 66 used to transport the traffic signal 14 between the first network node 12 and the second network node 12. Additionally, the placement indicator may be encoded within a field devoted to coordinating protection switching between network nodes 12. More detailed discussion and/or examples of such innovations are discussed below in connection with the following figures.

Figure 4:
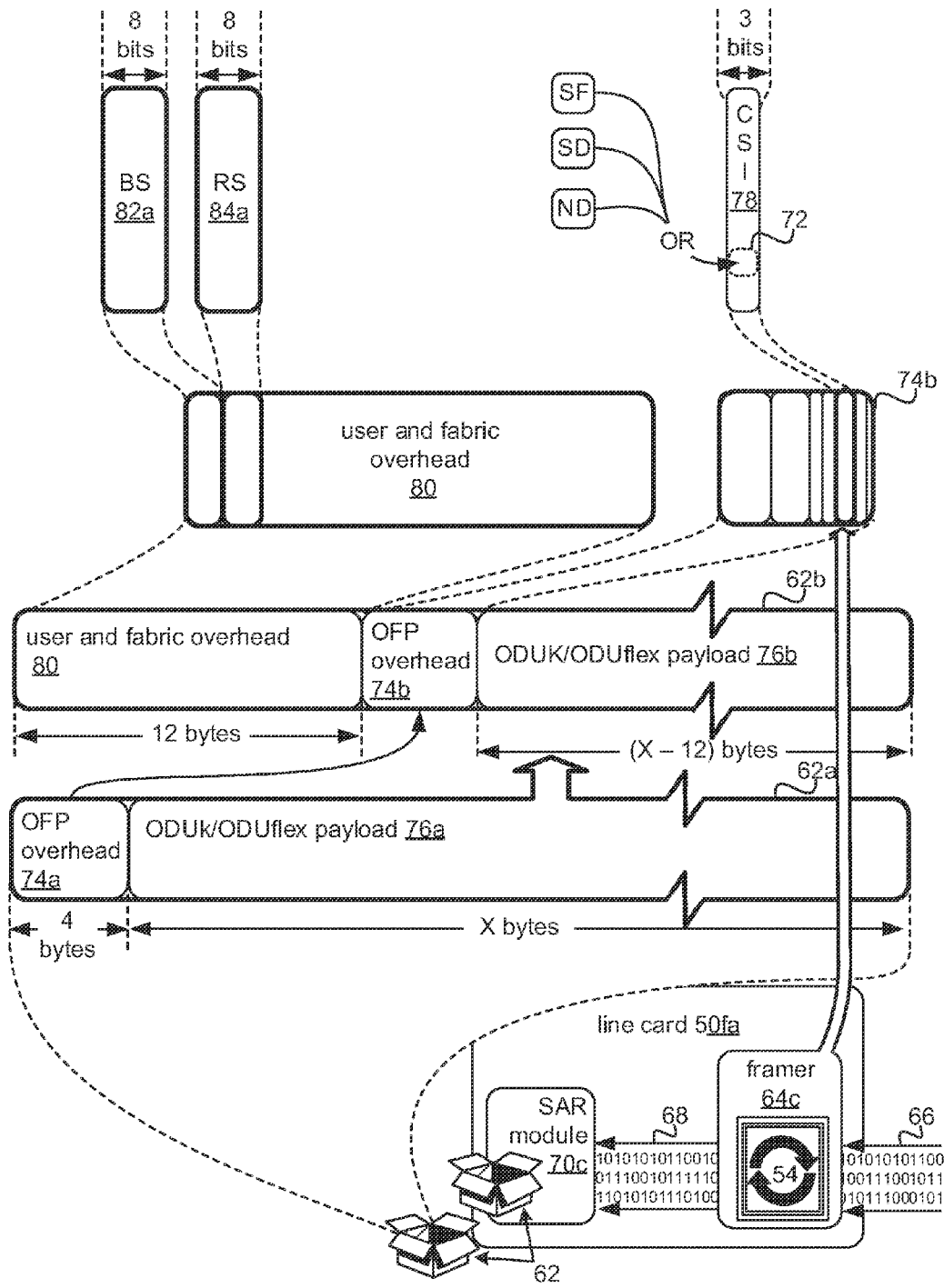
FIG. 4 is a schematic block diagram of potential locations in which Client Status Information (CSI), a Bridged Signal (BS) indicator, and/or a Requested Signal (RS) indicator may be encoded for in-band control signaling in a cell following the Optical Transport Network (OTN) over Packet Fabric Protocol (OFP), in accordance with examples.

Referring to FIG. 4, a non-limiting example of the use of packet/cells 62, formatted for packet-switched delivery by the switch fabric 32, to carry information used to coordinate the transfer of a traffic signal. The cells 62a 62b depicted in FIG. 4 are consistent with the OFP, but other types of cells 62 are possible. As in the previous figure, a line card 50fa is depicted receiving an ingress data stream 66, which may be processed by a channel monitor 54 to determine a channel state 72 for one or more channels 22, 24.

Examples of such a channel state 72 may include, without limitation, Signal Degrade (SD), Signal Fail (SF), and/or No Defect (ND). In some examples, the channel monitor 54 may be implemented at a framer 64c, such as an OTN framer 64c. The framer 64c may organize the data stream 66 into an organized stream of data units 68, such as, without limitation, a stream of ODUs 68. The channel monitor 54 and/or framer 64c may encode channel states 72 into the data units 68. Where the data units 68 are ODUs, the channel states 72 may be encoded in the ODUs 68 as Client Status Information (CSI) 72.

As discussed with respect to the previous figure, a cell/SAR module 70c may segment the data units 68 into much smaller cells/packages 62 in preparation for switching. The data units 68 may be much larger than the cells 62 produced by a SAR module 72c. For example, where the cells 62 are consistent with the OFP and the data units 68 are ODUs, the cells 62 may embody sizes of 128 bytes, 256 bytes, and/or 512 bytes. Conversely, the ODUs 68 may carry many thousands of bytes of data.

Where the cells 62 are consistent with the OFP, a cell 62a, 62b may include four bytes of OFP overhead 74a, 74b together with bytes for ODUk/flex payload 76a, 76b, with the size depending, at least in part on a value for 'k' from 0 to 4, or the flex designation. The SAR module 70c may encode the channel status 72 for the channel 22, 24 whose traffic signal 14 carried by the cell 62 in a CSI field 78 found in the OFP overhead 74b as the fifth field from a front end and the third field from a back end.

Additionally, the OFP provides for an optional user and fabric overhead field 80 of twelve bytes. This optional field 80 can reduce the size of the ODUk/flex payload 76b by occupying twelve bytes of the overall 128 bytes, 256 bytes, or 512 bytes allotted to the cell 62. Two of the twelve bytes may be used to carry information to coordinate the transfer of a traffic signal 14 between channels 22, 24. Although only two bytes may be utilized, in accordance with the OFP, all twelve bytes of the optional user and fabric overhead field 80 are reserved to make use of the bytes encoding the transfer information. In such examples, the line card 50 at the ingress side and/or a trailing SAR module 70 at the egress side may be set to interpret sequencing of the cells 62 as including the optional user and fabric overhead field 80.

A first byte 82 may encode a Bridged Signal (BS) indicating the signal 14 that is bridged onto the protection channel 24, or protection transport entity 24. The eight bits of the first byte 82 may be used to index 256 signals 14, including a null signal and an extra traffic signal. A second byte 84 may encode a Requested Signal (RS) indicating the signal 14 that is to be transferred to and/or carried over the protection entity/channel 24. Again, the eight bits may be used to index 256 signals 14.

By including the transfer information, such as, without limitation, the BS and/or RS, in the cells 62, aspects of a network node handling the cells 62 may have access to the transfer information. Consequently, the out-of-band signaling, and the latencies for which it is responsible, may be avoided. Furthermore, because the transfer information may be placed in multiple cells 62, the risk of an aspect of the corresponding network node 12 involved in transfer of traffic signal 14 missing a message 56 with state information 72 about one or more channels 22, 24 may be obviated.

However, unlike the CSI bits, which may be encoded in the CSI field 78 by the SAR module 70c, the transfer information, such as, without limitation, the BS and/or RS, may not be included by the SAR module 70c on a given line card 50fa. The transfer information and/or BS and/or RS must first be determined based on input from multiple line cards 50, collecting channel state 72 information for the relevant channels 22, 24. The following figure is used to discuss additional architecture capable of acquiring such information and/or making such determinations without recourse to out-of-band signaling.

Figure 5:
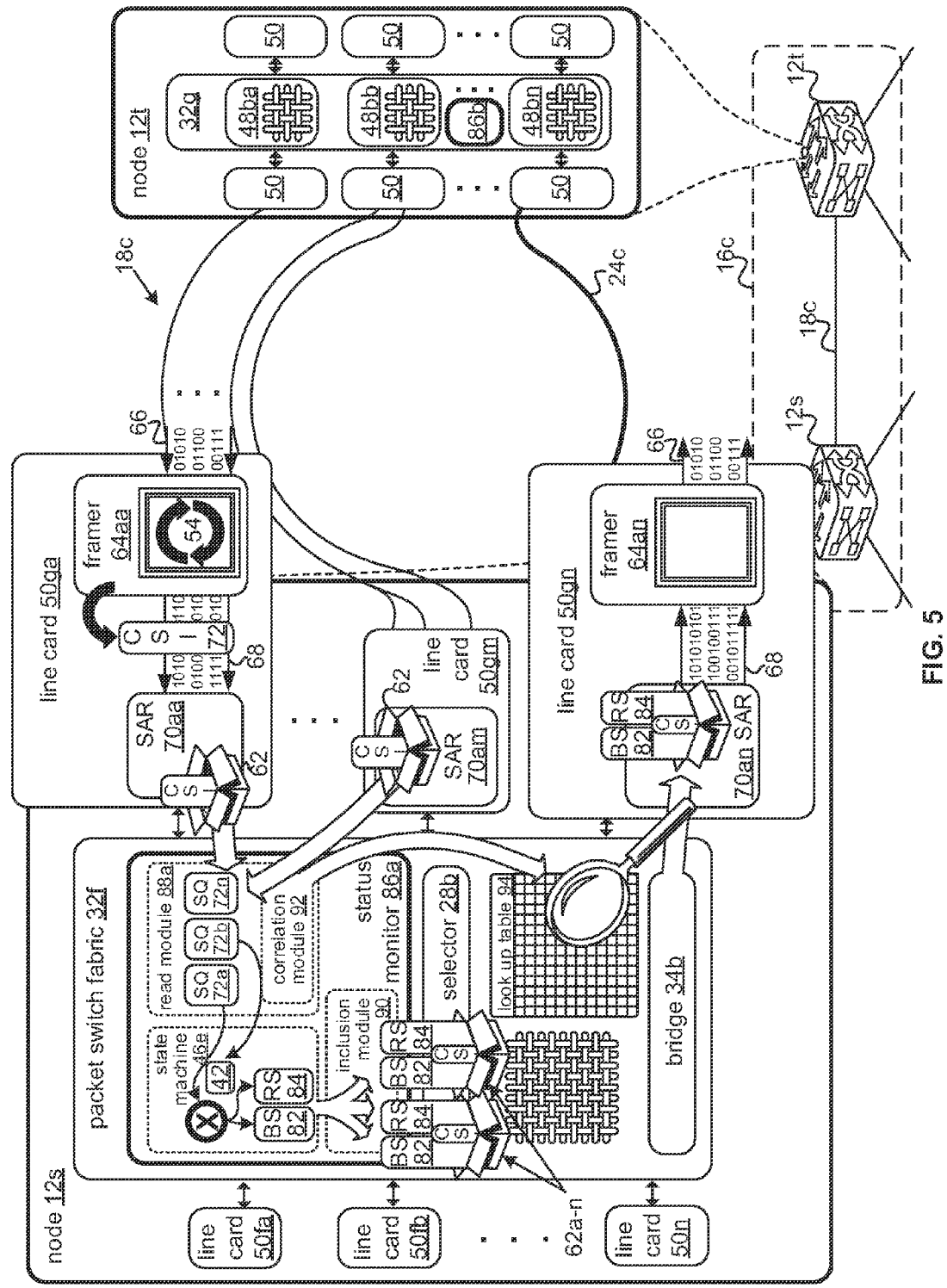
FIG. 5 is a schematic block diagram of a status monitor provided to read signal quality information, apply the information to a protection algorithm to identify a traffic signal that should be transferred to the protection channel, and encode a request to transfer the signal, where necessary, in the cells of the switch fabric, enabling in-band control signaling, in accordance with examples.
Figure 6:
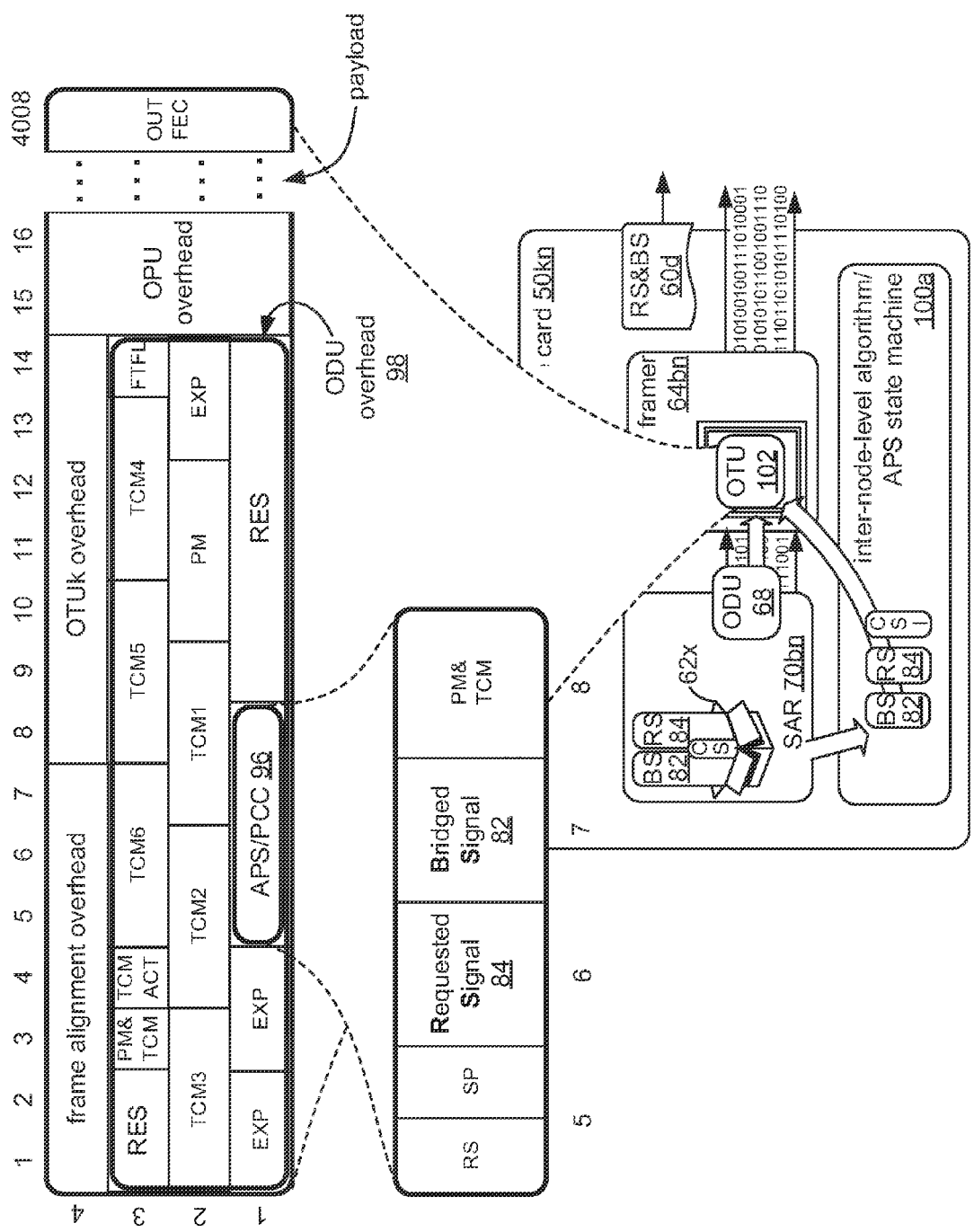
FIG. 6 is a schematic block diagram of examples of how in-band transfer signaling in cells may be interfaced with existing technologies for coordinating the transfer of a traffic signal between network nodes, in accordance with examples.

Referring to FIG. 5, a status monitor 86a, capable of acquiring signal quality information and/or channel state information 72 from multiple line cards 50 and making transfer determinations, is depicted in communication with packet switch fabric 32f. The status monitor 86a may serve a network node 12s in a pair 16c of network nodes 12s, 12t with a communication link 18c between them that may be implemented as a ring 18c. Another status monitor 86b may reside at the second network node 12t, also in communication with packet switch fabric 32g. Switch fabric 32h, which may be made up of multiple switch cards 48ba-48bn, may service multiple line cards 50 at the second network node 12t.

A status monitor 86 may include logic to determine if a traffic signal 14, such as a traffic signal 14 on a working channel 22 should be transferred to the protection channel 24c, and, in the case of competing traffic signals 14, which traffic signal 14 will be carried on the protection channel 24. For ease of explanation, a status monitor 86a local to the first network node 12s, which may be an O.NE 12s, is discussed, but the discussion may have similar applicability to the second status monitor 86b at the second network node 12t, which also may be an O.NE 12t.

The status monitor 86a, in communication with the packet switch fabric 32a may be operable to insert and/or encode transfer information used to ensure a particular traffic signal 14 is carried on the protection network 24c. As discussed above, the transfer information may, without limitation, include an initial Bridged Signal (BS) identifier and/or an initial Requested Signal (RS) identifier. Also, as discussed with respect to the previous figure, in some examples, the status monitor 86a may insert/encode the transfer information into a twelve byte optional user and fabric overhead field 80 of the cells 62aa-an handled by the packet switch fabric 32f.

However, to insert/encode this information, the status monitor 86a must first obtain it. The status monitor 86a may derive the traffic information, or a portion thereof, such as, without limitation, an RS identifier. To derive traffic information, the status monitor 86a may use signal quality information/channel states 72 from multiple line cards 50fa-fn, 50ga-gn supporting the channels 22, 24 in a protection group. To acquire the signal quality information/channel states 72, the status monitor 86a, may read information, such as, without limitation, CSI bits 72, encoded in the cells 62 provided to the switch fabric 32f from the various line cards 50fa-fn, 50ga-gn.

For example, in some scenarios, the status monitor 86a may be operable to identify an RS identifier from the signal-quality information 72 read by the status monitor 86a from CSI bits encoded in cells 62 carrying traffic signals 14 for multiple working transport entities/channels 22 in a protection group. Furthermore, the status monitor 86a may apply the signal quality information 72 to a protection algorithm 46e, such as, without limitation, an APS algorithm 46e, as set forth in International Telecommunications Union Technical (ITU-T) standards. The protection algorithm 46e may be implemented by the status monitor 86a as a state machine 46e.

The status monitor 86 may be implemented on or near the packet switch fabric 32f, such as, by way of example and not limitation, on a Fabric Interface Card (FIC), a Field Programmable Gate Array (FPGA), a microprocessor, and/or a proprietary chip, among other examples. More generally, a status monitor 86 may be viewed as a module. With respect to the modules discussed herein, aspects of the present invention may take the form of an entirely hardware embodiment, an entirely software embodiment (including firmware, resident software, micro-code, etc.), or an embodiment combining software and hardware aspects that may all generally be referred to herein as a "module." Furthermore, aspects of the presently discussed subject matter may take the form of a computer program product embodied in any tangible medium of expression having computer-usable program code embodied in the medium.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. Aspects of a module, and possibly all of the modules, that are implemented with software may be executed on a micro-processor, Central Processing Unit (CPU) and/or the like. Any hardware aspects of the module may be implemented to interact with software aspects of a module.

In some examples, the status monitor 86 itself may be considered as a system of modules for providing in-band, automatic protection switching for a network 10. For example, the status monitor 86a may include a read module 88a and/or an inclusion module 90 in addition to a module for a protection algorithm 46e, or state machine 46e. To provide signal transfer control information in the in-band signal via the cells 62a-n of the switch fabric 32f, the status monitor 86a may first determine what the signal transfer control information should be. To make such determination, the status monitor 86 a may acquire signal quality information 72 for various channels, or transport entities, 22, 24.

The read module 88a may be operable to acquire this data. In addition to the status monitor 86a being communicatively coupled to the packet switch fabric 32f, the read module 88a of the status monitor 86a may be operable to access the cells/packets 62a-n sent from the various line cards 50fa-fn, 50ga-gn. Furthermore, the read module 88a may be operable to read signal quality information 72, such as Client Status Information (CSI) bits from cells 62 sent to the switch fabric 32f.

In such examples, a channel monitor 54 may determine signal quality information and/or channel states 72 from the incoming data 66. Furthermore, a framer 64d and/or the channel monitor 54 may insert such signal quality information/channel states 72 into data 68, such as, without limitation, ODUs 68, received by a cell/SAR module 70aa. The cell module/SAR module 70aa, in turn, may encode the signal quality information 72 in the packets/cells 62a-n sent to the packet fabric switch 32f, where the signal quality information 72 may be read at one or more line cards 50fa-fn, 50ga-gn at the node 12s. By way of a non-limiting example consistent with the previous figure, in some scenarios, a SAR module 70aa may encode CSI bits in a CSI field 78 of an OFP header 74 in cells 62 segmented by the SAR module 70aa from streaming ODUs 68.

One or more units of signal quality information 72 may be read by the read module 88a from one or more different cells 62 carrying one or more different traffic signals 14 related to one or more different channels 22, 24. As discussed with respect to the previous figure, one or more channel monitors 54, which may or may not reside at one or more framers 64aa-an, at one or more line cards may 50fa-fn, 50ga-50gn may monitor various transport entities/channels 22, 24 and/or traffic signals 14 incorporated in data 66 received at the various line cards 50fa-fn, 50ga-50gn. The read module 88a may be operable, therefore, to correlate signal quality information 72, such as, without limitation, signal quality information 72 carried in the CSI bits 72, with one or more channels 22, 24 and/or transport entities 22, 24 between the first network node/O.NE 12s and the second network node/O.NE 12t.

Indeed, in some examples, the read module 88a may include a correlation module 92, or work in coordination with a correlation module 92. At a general level, a correlation module 92 in the status monitor 86a may be operable to index signal quality indicators 72 for multiple traffic signals 14 to multiple working channels 22, 24. For example, a correlation module 92 may be operable to access information 94 on the switch fabric 32f indexing different switch paths, or links, which may be provided in individual cells 62, to different transport entities/channels 22, 24 and/or signals 14 to correlate signal quality information/CSI bits 72 from multiple cells 62 to multiple working transport entities/channels 22, protection transport entities/channels 24, and/or traffic signals 14 in a protection group. In some examples, the indexing information 94 may be compiled in a look up table 94.

As can be appreciated, many different technologies may be utilized to implement the indexing information 94. Additionally, in some examples, the correlation module 92 may be operable to update the information 94 in the switch fabric 32f. For example and without limitation, the correlation module 92 may index different switch paths to different transport entities/channels 22, 24 in response to a switch of a traffic signal 14 from a first transport entity/channel 22, 24 to a second transport entity/channel 22, 24.

In addition to reading signal quality information 72, the status monitor 86a may be further operable to indicate placement of a traffic signal 14 from the working channel 22 onto the protection channel 24. The status monitor may indicate this placement of the traffic signal 14 based on the signal quality 72, as correlated to the working channel 22, satisfying requirements imposed by a protection algorithm 46e, or state-machine 46e, relative to other signal quality indicators 72 as correlated to other working channels 22.

Therefore, the status monitor 86a may include a protection module 46e and/or state machine 46e operable to apply signal quality information 72a-n correlated to one or more transport entities/channels 22, 24. In some examples, by way of illustration and not limitation, the protection algorithm 46e may be an APS algorithm 46e, as used for OTNs and defined in ITU-T standards. By applying the signal quality information 72 to the protection algorithm 46e, the protection module/state machine 46e may determine transfer information, or a placement indication, such as an RS identifier, designating a traffic signal 14 to be carried on a protection transport entity/channel 24c between the first network node/O.NE 12s and the second network node/O.NE 12t. In some examples, the state machine 46e may determine the RS identifier by applying signal quality information 72 correlated to the multiple working transport entities/channels 22 in the protection group to the APS algorithm 46e.

The protection module 46e and/or state machine 46e, for example, may privilege traffic signals with certain types of signal quality information 72, or channel states 72, over others. For example, a traffic signal with a channel state 72 of SF may be selected over a channel with a channel state 72 of SD. Where multiple channels 22/24 share similar types of signal quality information 72, or channel states 72, the protection module 46e and/or state machine 46e may privilege traffic signals 14 and/or channels 22, 24 with higher or lower index numbers. Additionally, or in the alternative, and among other possibilities, the nature of a given traffic signal 14, such as its tolerance to delay, may be considered.

Although the protection module 46e and/or state machine 46e have been discussed with respect to a single communication link 18c between the first node 12s and the second node 12t, as can be appreciated, the protection module 46e and/or state machine 46e may determine which signals 14 are to occupy other protection channels 24 for other communication links 18 between the first node 12s and other nodes 12. Similarly, the read module 88a, correlation module 92, inclusion module 90, and/or the status monitor 86a may also provide their services for other communication links 18 shared by the first node 12s with other nodes 12 in the network.

The inclusion module 90 may be operable, once the protection module 46e and/or state machine 46e has made a determination about a traffic signal 14 to be carried on the protection channel 24c, to include transfer information, or a placement indication, in one or more cells 62 carrying one or more traffic signals 14 pertaining to a protection group to which the transfer information, or a placement indication pertains. By way of an example and not of limitation, the inclusion module 90 may be operable to include an RS identifier within an overhead field 80 of a data cell 62 received by the switch fabric 36f for routing. Furthermore, by way of an example consistent with the previous figure, the inclusion module 90 of the status monitor may be operable to encode the RS identifier in an RS byte 84 and to place the RS byte 84 within a twelve-byte, optional user-and-fabric-overhead field 80. Inasmuch as a BS identifier may be helpful in effectuating the transfer of a traffic signal 14 between channels 22, 24, the inclusion module 90 may also encode the BS identifier in a BS byte 82 and place the BS byte 82 within the twelve-byte, optional user-and-fabric-overhead field 80.

By determining transfer information, or a placement indication, such as an RS identifier, and encoding it in cells 62, the status monitor 86a may provide the control information for protection signaling within in-band signaling, allowing the latency-producing, out-of-band communications discussed with respect to FIG. 2 to be avoided. Furthermore, cells/packets 62 may be continuously transmitted between line cards 50 and/or fabric cards 48 to make transfer information, a placement indication, and/or APS information, such as such as an RS identifier and/or BS identifier, readily available to all the participants implementing a protection group. In some scenarios, it may be useful to insure that the line card 50gn supporting the protection channel 24c may quickly receive transfer information/APS information. By placing an extra, delay-resistant traffic signal on the protection channel 24c that may be removed as needed, the rapid and/or continual arrival of cells 62 with the transfer information/APS information may be insured.

Consequently, as depicted in FIG. 5, the transfer information/APS information, or a placement indication, such as an RS identifier and/or BS identifier, may be transferred, in a cell 62 in which it has been included by the status monitor 86a, over the bridge 34b to the line card 50 supporting the channel 22, 24, to which a traffic signal 14 is being transferred. In the example depicted in FIG. 5, a traffic signal 14 may be in the process of being transferred to the protection channel 24c supported by line card 50gn. Additionally, the cells 62 may carry signal quality information 72, such as CSI bits 72, for various channels 22, 24.

The transfer of a traffic signal 14 between channels 22, 24, however, may also entail inter-node coordination between a pair 16c of nodes 12s, 12t that together support the channels 22, 24 involved. Cells 62 carrying transfer information, or a placement indication, may be utilized for intra-node coordination of a transfer of a traffic signal 14 and may assist in the inter-node coordination of the transfer between a pair 16c of nodes 12s, 12t. However, the cells 62 may not be formatted to carry transfer information/APS information, or a placement indication, and/or coordinate such a transfer between nodes 12s, 12t. Additional innovations, such as those discussed with respect to the following figure may be utilized.

Figure 7:
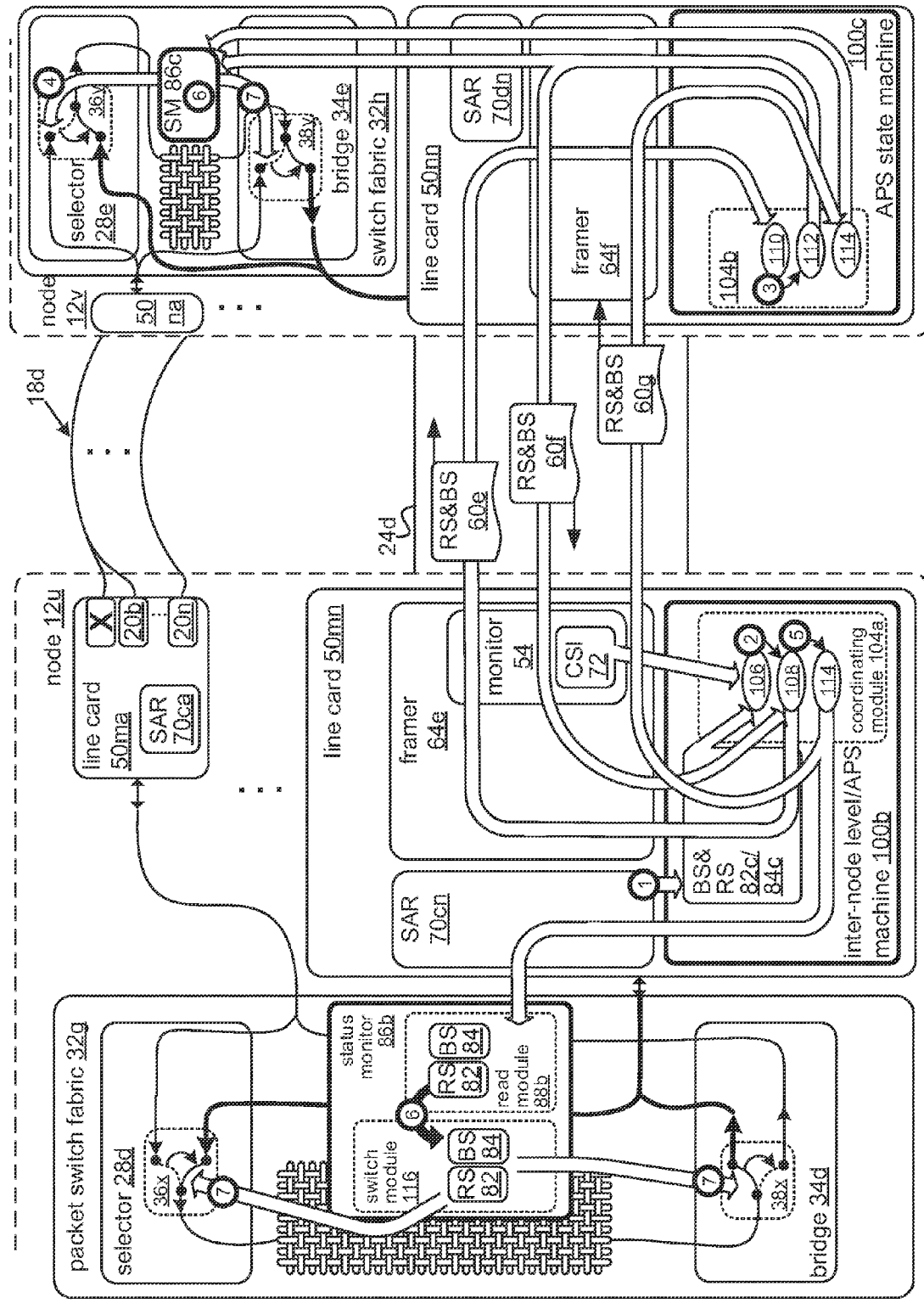
FIG. 7 is a schematic block diagram of the coordination of the transfer of a signal to the protection channel between the status monitor, a node-level state machine, such as an Automatic Protection Switching (APS) state machine, and a remote node through in-band control signaling, in accordance with examples.

Referring to FIG. 7, a cell 62 bridged from switch fabric 32 at a node 12 is depicted as received at a line card 50kn supporting a channel 24, 22 over which data 66 is transported. As discussed, the cell 62 may not be formatted to be transferred over a network 10 for inter-node coordination of the transfer of the traffic signal 14. Consequently, an additional, second, or trailing cell/SAR module 70bn, which may be located at the line card 50kn, or may be in communication therewith, may be provided.

As with a first cell/SAR module 70, a second, or trailing cell/SAR module 70bn may be operable to package a data unit 68 organized according to an internode format into data cells 62. Additionally, or in the alternative, the trailing cell/SAR module 70bn may be operable to re-assemble data cells 62 according to the internode format into data units 68 in preparation for transport to the second node 12. Hence, a first network node/O.NE 12, may include: a first cell/SAR module 70 involved in segmenting data units 68 into cells 62, a status monitor 86 involved in making determinations about the transfer of traffic, and a second cell/SAR module 70 involved in re-assemble data cells 62 for inter-node transport.

In some examples, the second, or trailing cell/SAR module 70bn may be operable to insert the placement indicator from a data cell 62 carrying the traffic signal 14 into a field 96 devoted to coordinating protection switching in a data unit 68 used to transport a traffic signal 14. For example and without limitation, the second SAR module 70bn may be operable to reassemble cells 62 into streaming ODUs 68 and insert the BS identifier and/or the RS identifier from a cell 62x merged into an ODU 68. In such examples, the trailing SAR 70bn may be operable to read an RS identifier and/or a BS identifier from the cell 62x and to insert the RS identifier and/or a BS identifier in an APS/Protection Communication Channel (PCC) field 96 provided in an ODU overhead field 98 of an ODU 68 for internode transmission over a transport entity 22, 24.

In such examples, a first cell/SAR module 70, a status monitor 86, and a second cell/SAR module 70bn residing at a first node/O.NE 12, may be matched by a remote first SAR module 70, a remote status monitor 86, and a remote second SAR module 70 residing at a second node/O.NE 12. The first node 12 and the second node 12 may support a protection group of transport entities/channels 22, 24 between them. For some of such examples, the status monitors 86 at the two nodes 12 may coordinate the transfer of traffic signal 14 among transport entities/channels 22, 24 between the two nodes 12.

However, where the status monitors 86 coordinate the transfer of traffic signals 14, additional architecture may be required to coordinate a transfer decision and/or execution between two nodes 12. In some examples, this additional coordination architecture may be proprietary. In other examples, an existing standard, such as the APS protocol defined in ITU-T standards, may be implemented, potentially with modifications.

For many examples, however, pre-existing architecture to coordinate protection switching between nodes may be harnessed. For example, the first node 12 may also include a node-level state machine 100a. The node-level state machine 100a may be operable to determine a channel 22 whose traffic signal 14 should be carried on the protection channel 24 and of coordinating, or negotiating, usage of the protection channel 24 with the second node 12. The inter-node-level state machine 100a may acquire signal quality information 72 of its own and/or make its own determinations about which traffic signal 14 the protection channel 24 should carry by applying, signal quality information 72 to an algorithm 46 implemented by the inter-node-level state machine 100a. Where a protection-channel-quality indicator is applied to the algorithm, for example, a protection channel monitor 54 may reside at a line card 50gn and may be communicatively coupled to the protection channel 24. In such examples, the protection channel monitor 54 may be operable to provide the node-level state machine 100a with the protection-channel-quality indicator for the protection channel 24.

The inter-node-level state machine 100a may also acquire a placement indicator, or transfer information, from the status monitor 86 on the node 12 at which it resides. In making determinations about which traffic signal 14 the protection channel 24 should carry, the inter-node-level state machine 100a may also apply the placement indicator, or transfer information, and/or any placement indicator, or transfer information, received from the second node 12 to the algorithm implemented by the inter-node-level state machine 100a. In such examples, the cell module 70bn may also provide access to information carried within data cells 62 received from and/or to be sent to the switch matrix 32 so that the inter-node-level state machine 100a may acquire a placement indicator, or transfer information, from a cell 62.

Upon the node-level state machine 100 determining a channel 22 whose traffic signal 14 should be carried on the protection channel 24, the node-level state machine 100 may encode the corresponding placement indicator, or transfer information, in an a format for inter-node transport to coordinate with a second node 12. Where the format for inter-node transport is consistent with OTN, such as streaming Optical Transfer Units (OTU) 102, the node-level state machine 100*a*, which may be an APS state machine 100*a* and/or a framer 64*bn* in communication with the node-level state machine 100*a* may encode an authoritative RS byte 84 and/or BS byte 82 in an APS/PCC field 96 provided in an ODU overhead field 98 of an OTU 102 frame streamed to the second node 12. The second node 12 may receive the transfer information/RS byte 84 as part of coordination message 60*d* similar to those discussed with respect to FIG. 1. In such examples, the in-band signaling in the cells 62 may be seamlessly integrated with additional protocols for protection switching, while avoiding latencies associated with out-of-band signaling.

Furthermore, in examples where the inter-node-level state machine 100*a* is an APS state machine 100*a*, as defined in ITU-T standards, the APS state machine 100*a* may be further operable to extract initial protection information, which may include a BS identifier 82, an RS identifier 84, CSI bits, and/or the like from the second, or trailing SAR module 70*bn*. The APS state machine 100 may also extract CSI bits 72 reporting on signal quality for a transport entity/channel 22, 24, either directly from an ODU 68, or indirectly from a channel monitor 54. Similarly, the APS state machine 100*a* may acquire a BS identifier 82, an RS identifier 84, CSI bits 72, and/or the like from the second node 12 supporting the protection group.

The APS state machine 100*a* may determine an authoritative RS identifier 84 by applying the initial protection information and/or the CSI bits 72 from the status monitor 86, signal quality information acquired locally by the APS state machine 100*a*, and/or information from the second node 12 supporting the protection group. As can be appreciated, where a status monitor 86 and the inter-node-level/APS state machine 100*a* both make traffic-signal-transfer determinations, a reconciliation process may be useful. Additional details about how the inter-node-level/APS state machine 100*a* may coordinate with the second node 12 and/or reconcile with the status monitor 86 are discussed with respect to the following figure.

Referring to FIG. 7, two network nodes 12*u*, 12*v* supporting a communication link 18*d* with a protection group are depicted to assist in an account of some examples of how the coordination of the transfer of a signal 14 to and/or from the protection channel 24 may be achieved, including coordination between status monitors 86 and node-level state machines 100. As before, the two nodes 12*u*, 12*v* may each include packet switch fabric 32*g*, 32*h* with selectors 28*c*, 28*d* and/or bridges 34*c*, 34*d*. The line cards 12*u*, 12*v* may also include one or more line cards 50*ma-mn*, 50*na-nn* supporting a communication link 18*d* between the two nodes 12*u*, 12*v*.

The communication link 18*d* may include multiple transport entities/channels 22, such as one or more working transport entities 22 and/or a protection transport entity/channel 24*d*. With respect to FIG. 7, the protection transport entity/channel 24*d* is enlarged to discuss one example of an approach to an exchange of messages 60 between the nodes 12*u*, 12*v* to coordinate signal transfer between the nodes. Additionally, one or more cell/SAR modules 70*ca*-cn, 70*da-dn* may be included at the nodes 12*u*, 12*v*, together with one or more channel monitors 54.

Additionally, each node 12*u*, 12*v* may include a status monitor 86*b*, 86*c* and/or an inter-node-level/APS state machine 100*b*, 100*c*, which may include a coordinating module 104*a*, 104*b* to compare transfer priorities with those at another node 12, negotiate a determination about utilization of the protection channel 24*d*, and/or coordinate the execution of that determination.

As discussed with respect to the previous figures, a status monitor 86*b*, 86*c* may acquire signal quality information 72 provided by channel monitors 54 and embedded in cells 62 by the cell/SAR modules 70*ca-cn*, 70*ca-cn* from across the node 12*u*, 12*v* at which the status monitor 86*b*, 86*c* resides. The status monitor 86*b*, 86*c* may apply this signal quality information to a protection algorithm 46 to make a determination about signal transfers relative to the protection channel 24*d*. The status monitor 86*b*, 86*c* may also encode a placement indication, or transfer information, such as an RS indicator 82 and/or BS indicator 84, in cells 62 sent to a trailing cell/SAR module 70*cn*, where another inter-node-level/APS state machine 100*b*, 100*c* may access the same.

As depicted in FIG. 7, both intra-node and/or inter-node coordination may begin with an inter-node-level/APS state machine 100*b* accessing a placement indication, or transfer information, such as an RS indicator 82 and/or BS indicator 84 from a trailing cell/SAR module 70*cn*. The inter-node-level/APS state machine 100*b* may apply signal quality information 72 received locally and/or information from the second node 12 to make its own determination 106 about utilization of the protection channel 24*d*. The inter-node-level/APS state machine 100*b* may also apply the transfer information from the status monitor 86*b*, together with other signal quality information 72, or CSI bits 72, obtained by the inter-node-level/APS state machine 100*b*, to the protection algorithm 46, according to a second step, to verify the transfer information with a verification determination.

To coordinate with the second node 12*v*, the inter-node-level/APS state machine 100*b* may encode its verification determination 108 as a placement indication, or transfer information, such as an RS indicator 82 and/or BS indicator 84, in data 66 being transferred to the second node 12*v*, such as via a framer 64*e*. For example, as discussed with respect to the previous figure, an RS indicator 82 and/or BS indicator 84 may be encoded in an APS/PCC field 96 provided in an ODU overhead field 98 of an OTU 102 frame streamed to the second node 12*v*. The data 66 with the transfer information may serve as a first message 60*e* to coordinate signal transfer.

As can be appreciated, different coordination protocols may be utilized. For ease of explanation, a coordination protocol consistent with the three phase approach to APS protocol set forth in ITU-T-REC-G.870 is discussed. In accordance with this three-phase approach, the verification determination 108 may be sent via a framer 64*e* as part of the first phase message 60*e*. The verification determination 108 may be received by a second inter-node-level/APS state machine 100*c* at a second node 12*v*, which may have made its own, second-node determination 110 about protection channel utilization. As part of a third step, the verification determination 108 may be reconciled with the second-node determination 110 by the second inter-node-level/APS state machine 100*c* to create a reconciled determination 112, with a corresponding placement indication, or transfer information, such as an RS indicator 82 and/or BS indicator 84.

Upon generating the reconciled determination 112 and according to a fourth step, a pre-existing mechanism, or the status monitor 86*b*, may update a selector cell 36*y* at the selector 28*e* in accordance with the corresponding placement indication, or transfer information, such as an RS indicator 82 and/or BS indicator 84. Where the status monitor 86b updates the selector 28e, the status monitor 86b may receive the traffic information used for the update from a cell 62 encoded with the information. Also, the reconciled determination 112 may be embedded in a second, phase-two message 60f sent back to the first node 12u. The reconciled determination 112 may be embedded in data 66 sent to the first node 12u in a manner similar to that by which the verification determination 108 may be embedded in the data 66 to the second node 12v.

As part of a fifth step, the first inter-node-level/APS state machine 100c may check the agreement of the verification determination 108 and the reconciled determination 112. Where the verification determination 108 and the reconciled determination 112 agree, the first inter-node-level/APS state machine 100b may make the reconciled determination 112 an authoritative determination 114 with a corresponding placement indication, or transfer information, such as an RS indicator 82 and/or BS indicator 84.

A sixth step may involve communicating the traffic information of the authoritative determination 114 to the first status monitor 86b. As stated, a trailing cell/SAR module 70cn may reassemble cells 62, which may be bridged onto a protection transport entity/channel 24d, into streaming ODUs 68, or other format. Also, the cell/SAR module 70cn may provide access to transfer information, such as a BS identifier, RS identifier, and/or CSI bits carried by a recent cell 62 to the inter-node-level/APS state machine 100b. The inter-node-level/APS state machine 100b may provide the transfer information, such as a verified RS identifier, to the trailing cell/SAR module 70cn for insertion in a cell 62 sent back to the status monitor 86b. In this way, the inter-node-level/APS state machine 100b may provide the authoritative RS identifier 84 to the second SAR module 70cn for inclusion in a cell 62 to be sent from the second SAR module 70cn to the status monitor 86b. More specifically, in some examples, a second inclusion module at a trailing SAR module 70cn may be operable to encode the RS identifier 84 in an RS byte 84 in a twelve-byte optional user and fabric overhead field 80 of a cell 62 to be sent from the trailing SAR module 70cn to the status monitor 86b.

Additionally, the first inter-node-level/APS state machine 100b may insert, whether directly or indirectly, the authoritative determination 114 in a third message 60g sent to the second node 12v, the authoritative determination 114 being embedded in data 66 in a manner similar to that discussed above. The second inter-node-level/APS state machine 100c may update the local status monitor 86c by a manner similar to which the authoritative determination 114 may be provided to the first status monitor 86b.

Furthermore, whether via a preexisting mechanism or the local status monitor 86c, a bridge cell 38y at the bridge 34e at the second node 12v may be updated in accordance with the corresponding placement indication, or transfer information, such as an RS indicator 84 and/or BS indicator 82. At the first node 12u, the status monitor 86b may also update a selector cell 36x at the selector 28d and/or a bridge cell 38x at the bridge 34d to match the authoritative determination 114. In some examples, a switch module 116 may be provided within the status monitor 86b. The switch module 116 may be operable, for example, to switch a traffic signal 14 on a working transport entity 22 referenced by the RS identifier to a protection transport entity 24d with a selector 36 and/or a bridge 38 for the corresponding traffic signal 14.

At this point, systems have been disclosed for the use of latency-reducing, in-band signaling to coordinate the transfer of a traffic signal 14 from a working entity 22 to a protection entity 24. These disclosures have covered such coordination at both an intra-node and an inter-node level. With respect to the following figure, additional disclosures are made with respect to in-band signaling where a traffic signal 14 may benefit from being transferred away from a protection channel 24d.

Figure 8:
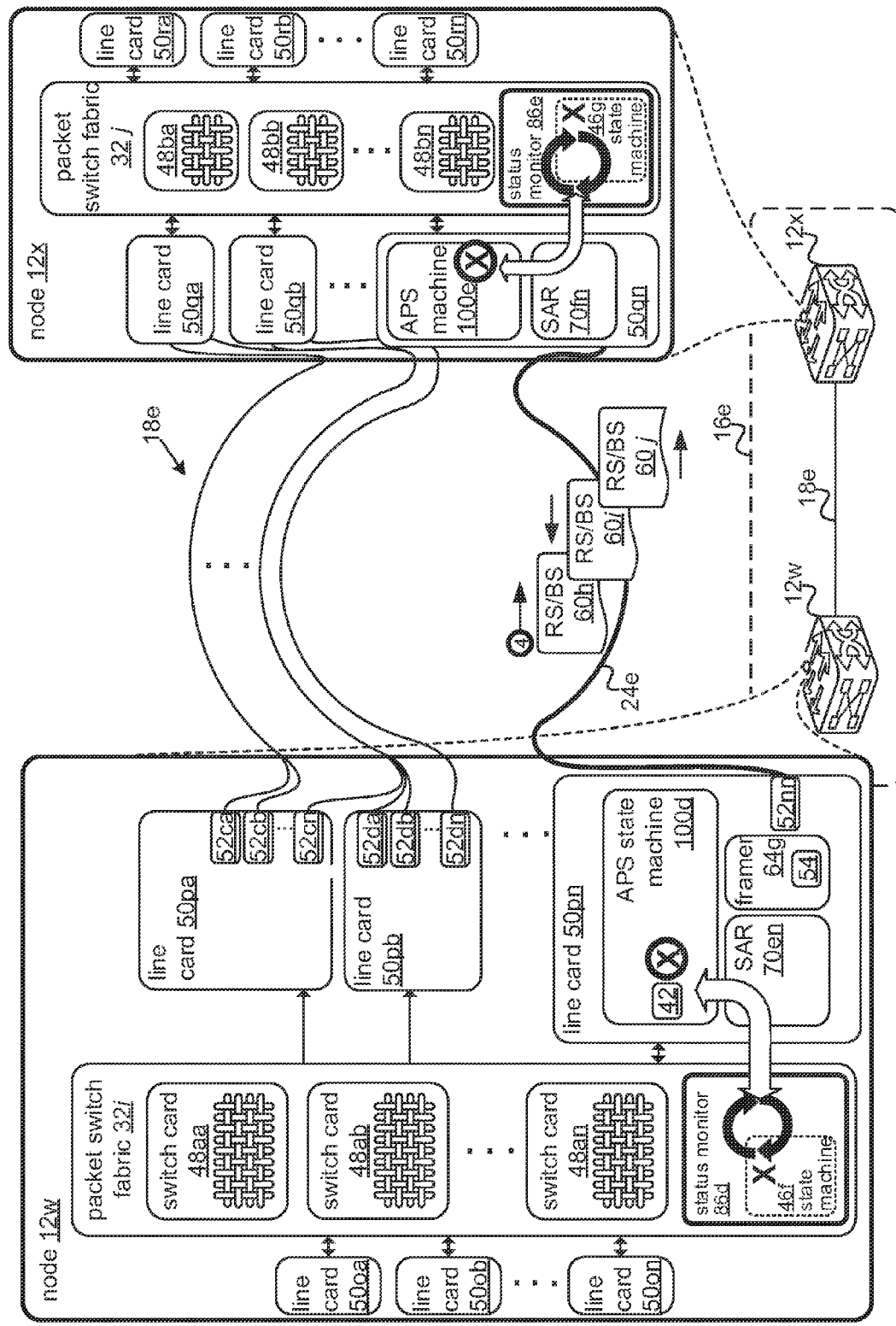
FIG. 8 is a schematic block diagram of a node-level state machine, such as an APS state machine, in communication with the status monitor and operable to determine when the protection channel itself is compromised, in accordance with examples.

Referring to FIG. 8, a node-level/APS state machine 100d may be implemented at a line card 50pn providing a port 52nn for the protection transport entity/channel 24e of a communication link 18e between two nodes 12w, 12x. The line card 50pn may include a channel monitor 54, potentially at a framer 64g. The channel monitor 54 may provide signal quality information 72, which may, without limitation, be encoded in CSI bits 72.

The node-level/APS state machine 100d may be operable to read signal quality information 72 for the protection transport entity/channel 24e from CSI bits 72 in a traffic signal carried on the protection transport entity/channel 24e. Additionally, the node-level/APS state machine 100d may apply the signal quality information 72 for the signal 14 on the protection transport entity/channel 24e to a protection algorithm 46f, which may be an APS algorithm implemented by the APS state machine 46f. As a result, the node-level/APS state machine 100d may create a BS identifier and/or an RS identifier indicating a determination to transfer a signal 14 from the protection transport entity/channel 24e to another transport entity 22. In such examples, the protection algorithm 46f may determine to return a traffic signal 14 to a working transport entity/channel 24e which previously carried the traffic signal 14.

The node-level/APS state machine 100d may then coordinate and/or negotiate the transfer of the protection signal 14 with the second node 12x as discussed with respect to the previous figure. Additionally, the node-level/APS state machine 100d may coordinate with the status monitor 86d by encoding the transfer information, or RS identifier, in a cell 62 made accessible by a trailing cell/SAR module 70en also at the line card 50pn, as also discussed with respect to the previous figures. In accordance with such disclosures, the signal transfers may be coordinated to protect network traffic in-band, while avoiding latency producing aspects of out-of-band signaling.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A system for in-band signaling for automated network protection, comprising:
  a channel monitor comprising hardware at a first network node operable to augment a traffic signal received at the first network node with a signal quality indicator for a working channel carrying the traffic signal between the first network node and a second network node;
  a switch matrix comprising hardware at the first network node, the switch matrix operable to perform packet-switched routing of data cells carrying the traffic signal; and
  a status monitor comprising hardware at the first network node and communicatively coupled to the switch matrix, the status monitor operable to indicate placement of the traffic signal, via the in-band signaling, from the working channel onto a protection channel also between the first network node and the second network node by the switch matrix, based on the signal quality indicator, as read by that status monitor from a data cell, satisfying requirements imposed by a state-machine-implemented algorithm provided by the status monitor, wherein the in-band signaling comprises communication between the status monitor and the switch matrix via overhead of the data cell which is formatted for packet-switched delivery by the switch matrix.

2. The system of claim 1, wherein the status monitor is further operable to place a placement indicator for placement of the traffic signal from the working channel onto the protection channel into the data cells carrying the traffic signal.

3. The system of claim 2, further comprising a cell module comprising hardware operable to:
re-assemble data cells from the switch fabric into an internode format used to transport the traffic signal between the first network node and the second network node; and
insert the placement indicator within a field devoted to coordinating protection switching between network nodes in the internode format.

4. The system of claim 2, further comprising:
a correlation module comprising hardware in the status monitor operable to index signal quality indicators for multiple traffic signals to multiple working channels, and wherein,
the status monitor is further operable to indicate placement of the traffic signal from the working channel onto the protection channel based on the signal quality as correlated to the working channel satisfying requirements imposed by a state-machine relative to other signal quality indicators as correlated to other working channels in the multiple working channels.

5. The system of claim 2, further comprising:
a cell module comprising hardware operable to:
package a data unit organized according to an internode format into data cells and to re-assemble data cells according to the internode format; provide access to information carried within data cells both received from and to be sent to the switch matrix; and
a node-level state machine operable to:
determine a channel whose traffic signal is to be carried on the protection channel by applying the placement indicator and a protection-channel-quality indicator to the algorithm implemented by the node-level state machine; and
provide the cell module with a channel identification for the channel whose traffic signal is to be carried on the protection channel for inclusion in a data cell to be sent to the status monitor.

6. The system of claim 5, further comprising a protection channel monitor residing at a line card communicatively coupled to the protection channel and operable to provide the node-level state machine with the protection-channel-quality indicator for the protection channel.

7. The system of claim 2, wherein a cell module is further operable to insert the placement indicator from a data cell carrying the traffic signal into a field devoted to coordinating protection switching between network nodes in a data unit used to transport a traffic signal between the first network node and the second network node.

8. A system for in-band, automatic protection switching for a network comprising a status monitor in communication via in-band signaling with switch fabric at a first Optical Network Element (O.NE), wherein each of the status monitor and the switch fabric are located at the first O.NE, the status monitor further comprising:
a read module comprising hardware operable to read Client Status Information (CSI) bits from cells sent to the switch fabric and to correlate signal quality information in the CSI bits with at least one transport entity between the first O.NE and a second O.NE;
a state machine implemented in hardware operable to apply signal quality information correlated to the at least one transport entity by an Automatic-Protection Switching (APS) algorithm to determine a Requested Signal (RS) identifier designating a traffic signal to be carried on a protection transport entity also between the first O.NE and the second O.NE; and
an inclusion module comprising hardware operable to include the RS identifier within an overhead field of a data cell received by the switch fabric for routing,
wherein the in-band signaling comprises communication between the status monitor and the switch fabric via overhead of the data cell which is formatted for packet switched delivery by the switch fabric.

9. The system of claim 8, further comprising:
a Segmentation And Reassembly (SAR) module comprising hardware operable to segment streaming Optical Data Units (ODU) into cells, organized according to the Optical Transport Network (OTN) over Packet Fabric Protocol (OFP), for packet-switched routing by the switch fabric; and wherein
the inclusion module of the status monitor is operable to encode the RS identifier in an RS byte and to place the RS byte within a twelve-byte optional user and fabric overhead field.

10. The system of claim 9, further comprising a trailing SAR module comprising hardware and wherein the SAR module and the trailing SAR module are set to interpret sequencing of the cells as including the optional user and fabric overhead field.

11. The system of claim 8, further comprising:
a trailing SAR module comprising hardware operable to reassemble cells bridged onto a protection transport entity into streaming ODUs and to provide access to at least one of a Bridged Signal (BS) identifier, the RS identifier, and CSI bits carried by a recent cell to an APS state machine comprising hardware;
the APS state machine operable to:
implement the APS algorithm with a state machine,
verify the RS identifier accessed from the trailing SAR module and applied to the APS algorithm together with other CSI bits obtained by the APS state machine; and
provide the RS identifier as an authoritative RS identifier to the trailing SAR module for insertion in a cell sent back to the status monitor.

12. The system of claim 11, further comprising:
the APS state machine implemented at a line card providing a port for the protection transport entity and operable to:
read signal quality information for the protection transport entity from CSI bits in a traffic signal carried on the protection transport entity; and
create an RS identifier indicating a determination to transfer a signal from the protection transport entity to another transport entity made by applying the signal quality information for the signal on the protection transport entity to an APS algorithm implemented by the APS state machine; and a second inclusion module comprising hardware at a trailing SAR module operable to encode the RS identifier in an RS byte in a twelve-byte optional user and fabric overhead field of a cell to be sent from the trailing SAR module to the status monitor.

13. The system of claim 8, further comprising a switch module comprising hardware within the status monitor operable to switch the traffic signal on a working transport entity referenced by the RS identifier to a protection transport entity with at least one of a selector and bridge for the traffic signal.

14. The system of claim 8, further comprising a trailing SAR module comprising hardware operable to read the RS identifier from a cell and to insert the RS identifier in an APS/Protection Communication Channel (PCC) field provided in an ODU overhead field of an ODU for internode transmission over a transport entity.

15. system of claim 8, further comprising a correlation module comprising hardware within the read module of the status monitor operable to access information on the switch fabric indexing different switch paths to different transport entities to correlate CSI bits from multiple cells to multiple working transport entities in a protection group; and wherein
the state machine of the status monitor is further operable to determine the RS identifier by applying signal quality information correlated to the multiple working transport entities in the protection group to the APS algorithm.

16. The system of claim 8, further comprising a correlation module within the read module operable to update information in the switch fabric indexing different switch paths to different transport entities in response to a switch of the traffic signal from a first transport entity to a second transport entity.

17. A system for Automatic Protection Switching (APS) for optical networks, comprising
a first Segmentation And Reassembly (SAR) module comprising hardware operable to encode Client Status Information (CSI) bits in a CSI field of an Optical Transport Network (OTN) over Packet Fabric Protocol (OFP) header in cells segmented by the SAR module from streaming Optical Data Units (ODU);
a status monitor comprising hardware in communication with a switch fabric, each of the status monitor and the switch fabric are located at a same network element, and the status monitor is operable to insert at least one of an initial Bridged Signal (BS) identifier and an initial Requested Signal (RS) identifier in a twelve byte optional user and fabric overhead field of cells for in-band signaling to the switch fabric, the RS identifier being derived from signal quality information read by the status monitor from CSI bits in cells and applied to an APS algorithm implemented as a state machine by the status monitor, wherein the in-band signaling comprises communication between the status monitor and the switch fabric via overhead of the data cells which are formatted for packet-switched delivery by the switch fabric; and
a second SAR module comprising hardware operable to reassemble cells into streaming ODUs.

18. The system of claim 17 further comprising an APS state machine operable to:
extract initial protection information comprising at least one of the initial BS identifier, the initial RS identifier, and CSI bits from the second SAR module;
extract CSI bits reporting on signal quality for a protection transport entity from an ODU;
determine an authoritative RS identifier by applying the initial protection information and the CSI bits reporting on signal quality for the protection transport entity to a second instance of the APS algorithm implemented by the APS state machine; and
provide the authoritative RS identifier to the second SAR module for inclusion in a cell to be sent from the second SAR module to the status monitor.

19. The system of claim 17, wherein the status monitor is further operable to identify the RS identifier from the signal-quality information read by the status monitor from CSI bits applied to the APS algorithm from multiple working transport entities in a protection group.

20. The system of claim 17, wherein the first SAR module, the status monitor, and the second SAR module reside at a first OTN Network Element (O.NE) are matched by a remote first SAR module, a remote status monitor, and a remote second SAR module residing at a second O.NE to implement APS for a protection group of transport entities between the first O.NE and the second O.NE.

* * * * *